Sept. 30, 1952        I. C. BLAKE        2,612,536
PRIMARY CELL
Filed May 5, 1951
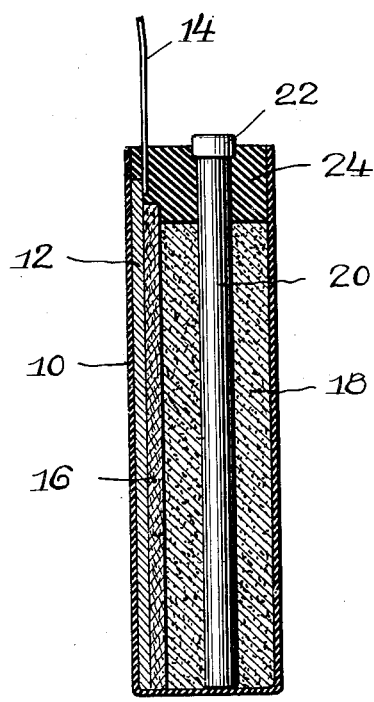
Inventor,
Ivan C. Blake,
By: Jones, Tesch & Darbo
Attys.

Patented Sept. 30, 1952

2,612,536

UNITED STATES PATENT OFFICE 2,612,536

PRIMARY CELL

Ivan C. Blake, Freeport, Ill., assignor to Burgess Battery Company, Freeport, Ill., a corporation of Delaware Application May 5, 1951, Serial No. 224,684

9 Claims. (Cl. 136—107)

This invention relates to improvements in primary cells and more particularly to improvements in the composition of dry cells of the Leclanché type whereby their shelf life is improved.

One of the most important problems of the dry cell industry is the prevention of deterioration of the cells when they are not in operation, that is, while they are in storage or on shelf. There is a tendency for corrosion of the zinc negative electrode to take place at the surface thereof which is exposed to the electrolyte. Frequently this takes place at local areas whereby the negative electrode becomes pitted and prematurely punctured, with the result that the useful life of the cell and its energy delivering capacity are considerably reduced. Many expedients have been employed to inhibit such objectionable corrosion and among these is the use of chromium trioxide and salts of chromic acid, and also the use of mercury and various salts of mercury. As an example, the use of the combination of mercuric chloride and chromic acid or a soluble salt of chromic acid, such as sodium dichromate, is described in U. S. Patent 1,839,498 and has been found to be effective for the purpose.

In accordance with the present invention, it has been discovered that a group of double chromate salts of barium consisting of barium potassium chromate, $BaK_2(CrO_4)_2$, barium sodium chromate, $BaNa_2(CrO_4)_2$, and barium ammonium chromate, $Ba(NH_4)_2(CrO_4)_2$ possess superior effectiveness in inhibiting corrosion of the zinc negative electrode when used alone or in combination with a salt of mercury. The barium potassium chromate is a true double chromate and the other compounds each exist as a mixture of the true double chromate and the two single chromates involved. For convenience they will all be referred to herein as double chromates.

It has been found that these compounds when made available at the surface of the negative electrode which is exposed to the electrolyte possess remarkable effectiveness in reducing corrosion during inactivity and at the same time exhibit a minimum inhibiting effect upon the current delivering powers of the cell during operation. Exceptionally good results have been obtained with barium potassium chromate and it is the preferred compound.

Accordingly, it is the object of the invention to provide a primary cell of the character described in which spontaneous corrosion of the negative electrode is effectively inhibited by the inclusion in the cell of a compound from the group described heretofore, alone or in combination with a salt of mercury.

The invention will be described in connection with a specific embodiment of a dry cell. It is to be understood that the embodiment is given by way of illustration and that the invention is not limited thereto but may be applied to cells of other structural form.

The single figure of the drawing is a midsectional elevation of the embodiment of the cell.

The cell is of flat rectangular shape and is adapted to be arranged in stacked relation with and connected to additional cells to form a multiple cell battery of rectangular shape. It comprises an open-top rectangular container or envelope 10 of non-conductive electrolyte-resistant material, such as the copolymer of vinyl acetate and vinyl chloride, rubber hydrochloride, a polymer of ethylene, or the like. Within the envelope is the negative electrode 12 which is composed of zinc and is in the form of a thin flat sheet or plate. A terminal conductor 14 is electrically connected to electrode 12 and projects upwardly therefrom and serves as the negative terminal of the cell. Adjacent to the negative electrode 12 is a separating member 16 which is a sheet or layer of bibulous, non-conductive material such as paper. Adjacent to the separating member 16 is a rectangular block of compressed depolarizing mix 18, which may be of any suitable composition, such as a mixture of powdered manganese dioxide and carbon. The separating member 16 and depolarizing mix 18 are moistened with the cell electrolyte which may be the usual chloride electrolyte composed of a substantially non-alkaline aqueous solution of zinc chloride and ammonium chloride. The separating member 16 prevents contact between the mix 18 and the negative electrode 12. Embedded in the mix 18 is the upright carbon rod 20 which serves as the positive electrode of the cell. A metal conductive cap 22 fits tightly upon the upper end of the positive electrode 20 and serves as the positive terminal of the cell.

The envelope 10 extends above the separator 16 and the mix 18 and the positive and negative terminals 22 and 14 project above the top of the envelope 10. The space in the upper portion of the envelope contains a fusible sealing composition 24 composed of pitch or wax, which forms a seal closure for the cell. In practice, the cells which make up a multiple cell battery are assembled in such manner that they are under pressure and the elements of each cell are held in firm contact with one another. The positive and negative terminals 22 and 14 are exposed above the seal 24 and are available for connection to the other cells or an external circuit.

In accordance with the present invention, a double chromate from the group described heretofore, alone or in combination with a mercury salt, is caused to be present at the surface of the negative electrode 12 which is exposed to the electrolyte, that is, the surface exposed to the separating member 16. In practice this is done by making the compound accessible to the electrolyte whereby it goes into solution and is present in the electrolyte. That is, the compound is brought into access relation to the electrolyte. This may be accomplished by direct introduction of the compound into the electrolyte during the preparation of the latter, or by incorporating the compound in the depolarizing mix 18 or the separating member 16 before the cell is assembled. Any of these methods of introduction brings the compound into access relation to the electrolyte and produces substantially the same results. The compounds have different solubilities, but in general they are soluble to only a limited extent in water and the aqueous electrolyte, and it is usually desirable to incorporate more in the cell than will go initially into solution in the electrolyte. The preferred method is to incorporate the compound in the mix. It becomes dissolved in the electrolyte with which the mix is moistened and thereby becomes available for the inhibiting action at the surface of the negative electrode 12.

The reasons for the exceptional effectiveness of the double chromate compounds described is not understood. The compounds are sparingly soluble in water and the electrolyte and go into solution slowly. The following table gives the amount of each of the compounds which is dissolved in water and in a solution composed of 22 parts of zinc chloride, 28 parts of ammonium chloride and 50 parts of water, which solution is an example of a suitable electrolyte. In each case the amount is given in grams dissolved per 100 grams of the solvent after standing in the solvent for 72 hours:

*Table 1*

| Compound | Water | Electrolyte |
|---|---|---|
| Barium potassium chromate | 1.86 | 0.97 |
| Barium sodium chromate | 2.38 | 1.59 |
| Barium ammonium chromate | 3.14 | 3.05 |

Only a small quantity of the compound is in solution in the electrolyte at any one time and active for the inhibiting function, but this apparently is sufficient. It is believed that as it is consumed in the action which accompanies the inhibiting function, more of the compound is progressively dissolved and released, and the inhibiting function is in this manner maintained in an advantageous manner throughout the life of the cell.

The amount of the compound which may be used and will produce satisfactory inhibiting results is not critical. Since the compound is made available to the negative electrode by reason of its being in solution in the electrolyte, and since it is only moderately soluble in the electrolyte, for economical reasons more need not be used than enough to provide a supply dissolved in the electrolyte until the end of the life of the cell. Preferably an amount is used which will maintain the electrolyte saturated with the compound throughout the life of the cell. Only a relatively small amount of the compound is required. For example, in a dry cell of the flat construction described heretofore in which the depolarizing mix 18 is 2 inches high, 1¾ inches wide and ⅜ inch thick, and weights 48 grams, an amount of barium potassium chromate containing $CrO_3$ in an amount equal to approximately 0.065 to 0.30 gram has been used with highly satisfactory results. This is equivalent to .0025 gram to .012 gram of $CrO_3$ per square centimeter of negative electrode surface exposed to the electrolyte. This is an excess over the amount which will go into solution initially in the electrolyte, which is in accordance with the explanation given heretofore. An amount greater than given in the foregoing may be used if desired but generally will not result in improved performance. The amounts of the other double chromate salts described heretofore may be such as to provide an amount of $CrO_3$ generally equivalent to that set forth with respect to barium potassium chromate.

As stated heretofore, mercury may be present in the cell in combination with the double chromate compound. The mercury may be introduced in the form of a suitable mercury salt having at least a slight degree of solubility in water. The salt may be inorganic or organic in character and the range of solubility may be from slightly soluble to very soluble in water or the electrolyte of the cell. Suitable examples of the mercury salt are mercurous chloride, mercuric chloride, mercuric bromide, mercurous sulfate, mercuric chlorate, mercuric nitrate, mercurous acetate and mercuric acetate. Mercuric nitrate is very soluble and mercurous chloride has a solubility of .0002 gram per 100 grams of water at 25° C.

A relatively small amount of the mercury salt is all that is required. For a cell such as has been specifically described heretofore, a quantity containing mercury in an amount equal to approximately .00075 to .0125 gram per cell, or approximately .00003 to .0005 gram per square centimeter of the zinc electrode surface exposed to the electrolyte, is satisfactory.

The mercury salt may be incorporated in the cell by introducing it directly into the electrolyte or it may be incorporated in the separating member 16 before the cell is assembled. If it is incorporated in the separating member, this may be done in any suitable manner as by including it in the slurry of paper fibers in the wet machine of a paper making apparatus and felting it along with the fibers upon the paper making screen. As an alternative, the previously formed sheet may be moistened with a suspension or solution of the mercury salt and then dried. In any of these methods of introduction, the mercury salt is brought into access relation with the electrolyte and becomes available at the surface of the negative electrode, apparently by going into solution in the electrolyte. Even the slightly soluble mercury salts, such as mercurous chloride, are sufficiently soluble that enough becomes available at the surface of the negative electrode to perform the inhibiting function. In any event, the mercury salt contributes substantially to the inhibiting action, and an improved cell is obtained by reason of its presence.

The following information demonstrates the effectiveness of the double chromate compounds of the group described heretofore, alone and in combination with a mercury salt as a means for inhibiting spontaneous corrosion of the zinc negative electrode.

Data are given for cells employing barium potassium chromate, but it is understood that any other of the double chromate compounds, or mixtures of such compounds, may be used with substantially equivalent results. Several lots of the construction specifically described heretofore were made and tested. The cells were of similar construction except for the inhibitor which was used. In the following the amount of inhibitor is in terms of grams per square centimeter of zinc electrode exposed to the electrolyte. Cell No. 1 contained chromic acid in the electrolyte, which was added in the form of chromium trioxide in the amount of .003 gram of $CrO_3$. Cell No. 2 contained barium potassium chromate in the mix in an amount equivalent to .0078 gram of $CrO_3$. Cell No. 3 contained chromic acid, added in the form of chromium trioxide, and mercuric chloride in the electrolyte, in amounts equivalent to .00005 gram of $CrO_3$ and .00005 gram of Hg. This is in accordance with U. S. Patent 1,839,498. Cell No. 4 contained barium potassium chromate in the mix in an amount equivalent to .0072 gram of $CrO_3$ and mercurous chloride in the electrolyte in an amount equivalent to .000089 gram of Hg. All had an open circuit voltage between 1.63 and 1.66 volts when freshly made, and were tested again after having been on shelf for six weeks. At the second test, any cell which had an open circuit voltage lower than its maximum open circuit voltage minus .04 volt was considered to be defective because experience has shown that such a decline is indicative of rapid deterioration on shelf. The results of the tests are given in Table 2.

Table 2

| Cell | Number of cells tested | Number of cells testing defective |
|---|---|---|
| No. 1 ($CrO_3$ only) | 165 | 54 |
| No. 2 ($BaK_2(CrO_4)_2$) | 135 | none |
| No. 3 ($CrO_3+HgCl_2$) | 180 | 14 |
| No. 4 ($BaK_2(CrO_4)_2+HgCl$) | 180 | none |

The very superior inhibiting properties of barium potassium chromate are evident from the above data. The difference in the location of the inhibitor in the various cells produces no appreciable difference in performance and the difference in the amount of inhibitor may produce a slight difference but does not produce a sufficient difference to be significant with respect to the comparative performance results of the different cells as this is shown by the data given herein. As is stated hereinbefore, the amount and location of the inhibitor are not critical.

Groups of cells Nos. 1, 2, 3 and 4 were subjected to discharge performance tests after inactive storage for six months at approximately 70° F. The test consisted of discharging batteries composed of a number of the cells connected in series. Each battery was discharged through a resistance amounting to 166⅔ ohms per cell for a period of four hours and then allowed to rest for 16 hours. This procedure was repeated until the closed circuit voltage of the battery had dropped to the equivalent of 1.0 volt per cell. The capacity in terms of hours of service on this test for the various batteries is given in Table 3.

The data show that the capacity of cell No. 2 is greater than that of cell No. 1 after six months Table 3

| Cell | Capacity—6 months |
|---|---|
| No. 1 | 48.4 |
| No. 2 | 49.2 |
| No. 3 | 47.9 |
| No. 4 | 51.4 | on shelf. This shows that barium potassium chromate possesses inhibiting properties superior to those of chromic acid, which is representative of the chromium compounds used prior to this invention.

The data also show that the capacity of cell No. 4 is greater than that of any of the other cells, which shows that the addition of a mercury salt to the barium potassium chromate results in improved inhibiting properties.

Another group of the cells was tested for open circuit voltage and short circuit current after inactive storage at 70° F. for a period of 8 months. The data with respect to these cells are as follows:

Table 4

| Cell | Open Circuit Voltage at 8 months | Short Circuit Current at 8 months |
|---|---|---|
| | Volts | Amperes |
| No. 1 | 1.584 | 0.73 |
| No. 2 | 1.584 | 0.77 |
| No. 3 | 1.583 | 0.76 |
| No. 4 | 1.599 | 0.79 |

The data show that the cells containing barium potassium chromate and a mercury salt have current delivering powers superior to any of the others, and that those containing barium potassium chromate alone have powers superior to cells employing the type of chromium compound used prior to this invention. It is believed that the advantages in the use of barium potassium chromate shown by Tables 3 and 4 are due in part at least, to the fact that such compound exerts a lesser current depressing effect than do the chromium compounds used prior to this invention.

Variations may be made from the foregoing specific disclosure by those skilled in the art without departing from the spirit of the present invention. For example, the physical structure of the cell may be varied in any way as desired, the flat cell illustrated being merely an example of a suitable cell.

What is claimed is:

1. In a primary cell having an electrolyte and a zinc negative electrode, a spontaneous corrosion inhibiting compound in access relation to said electrolyte from the group consisting of barium potassium chromate, barium sodium chromate and barium ammonium chromate.

2. In a primary cell having a chloride electrolyte and a zinc negative electrode having a surface thereof exposed to said electrolyte, a compound in access relation to said electrolyte from the group consisting of barium potassium chromate, barium sodium chromate and barium ammonium chromate, said compound being present in an amount providing approximately .0025 to .012 gram of $CrO_3$ per square centimeter of negative electrode surface exposed to said electrolyte.

3. A primary cell comprising a positive electrode, a zinc negative electrode and a chloride electrolyte, a depolarizing mix in acess relation to said positive electrode, said depolarizing mix containing a compound from the group consisting of barium potassium chromate, barium sodium chromate and barium ammonium chromate.

4. In a primary cell having a chloride electrolyte and a zinc negative electrode, barium potassium chromate in access relation to said electrolyte.

5. In a primary cell having a chloride electrolyte and a zinc negative electrode, a mercury salt having at least a slight degree of solubility in water and a double chromate compound from the group consisting of barium potassium chromate, barium sodium chromate and barium ammonium chromate in access relation to said electrolyte.

6. In a primary cell having an electrolyte and a zinc negative electrode having a surface thereof exposed to said electrolyte, a mercury salt having at least a slight degree of solubility in water and a double chromate compound from the group consisting of barium potassium chromate, barium sodium chromate and barium ammonium chromate in access relation to said electrolyte, said mercury salt and double chromate compound respectively being present in amounts providing approximately .00003 to .0005 gram of mercury and approximately .0025 to .012 gram of $CrO_3$ per square centimeter of zinc electrode surface exposed to said electrolyte.

7. In a primary cell having a chloride electrolyte and a zinc negative electrode having a surface thereof exposed to said electrolyte, barium potassium chromate and a mercury salt having at least a slight degree of solubility in water in access relation with said electrolyte, said chromate and said mercury salt being present respectively in amounts providing approximately .0025 to .012 gram of $CrO_3$ and approximately .00003 to .0005 gram of mercury per square centimeter of zinc electrode surface exposed to said electrolyte.

8. In a primary cell having a chloride electrolyte and a zince negative electrode, barium sodium chromate in access relation to said electrolyte.

9. In a primary cell having a chloride electrolyte and a zinc negative electrode, barium ammonium chromate in access relation to said electrolyte.

IVAN C. BLAKE.

REFERENCES CITED

The following references are of record in the file of this patent:

UNITED STATES PATENTS

| Number | Name | Date |
|---|---|---|
| 1,839,498 | Porth | Jan. 5, 1932 |
| 2,422,045 | Ruben | June 10, 1947 |
| 2,491,640 | Blake | Dec. 20, 1949 |